(12) United States Patent
Hara (10) Patent No.: US 6,179,692 B1
(45) Date of Patent: Jan. 30, 2001

(54) WORK MACHINING METHOD (75) Inventor: Mitsugu Hara, Osaka (JP)

(73) Assignee: Ecoreg Ltd., Osaka (JP)

( * ) Notice: Under 35 U.S.C. 154(b), the term of this patent shall be extended for 0 days.

(21) Appl. No.: 09/225,538

(22) Filed: Jan. 5, 1999

(30) Foreign Application Priority Data

Sep. 8, 1998 (JP) .................................................. 10-254399

(51) Int. Cl.[7] .............................. B24B 1/00; B24B 55/02
(52) U.S. Cl. ............................ 451/53; 451/449; 451/450
(58) Field of Search .................................. 72/47, 42, 43; 451/53, 449, 450; 83/168, 169, 171, 15, 24

(56) References Cited

U.S. PATENT DOCUMENTS 5,524,465 * 6/1996 Kajiwara et al. ......................... 72/42

5,678,466 * 10/1997 Wahl ..................................... 451/171

FOREIGN PATENT DOCUMENTS 8-197311    8/1996 (JP) .

* cited by examiner

*Primary Examiner*—Rodney A. Butler
(74) *Attorney, Agent, or Firm*—Armstrong, Westerman, Hattori, McLeland & Naughton (57) ABSTRACT

A work machining method including ejecting a mist of cooling water on a face side of an outside diameter tool from a nozzle of a cooling water supply tube and ejecting a mist of oil cutting fluid on a flank side of the outside diameter tool from a nozzle of an oil cutting fluid supply tube, the nozzle of the cooling water supply tube and the injection nozzle of the oil cutting fluid tube being mounted on a turret. With such a method, durability of the machining tool and the finishing accuracy of the machined surface can be improved and no environmental problem is caused.

2 Claims, 11 Drawing Sheets

WORK MACHINING METHOD

BACKGROUND OF THE INVENTION

1. Field of the Invention

The present invention relates generally to a work machining method such as machine cutting and grinding.

2. Description of the Prior Art

Figure 21:
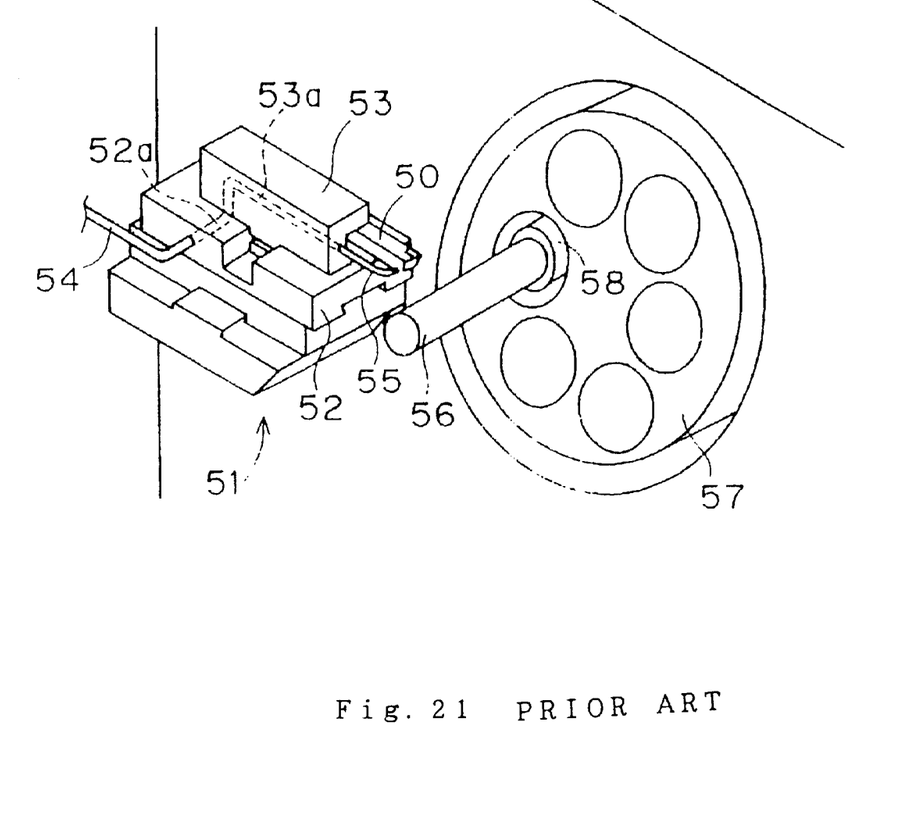
FIG. 21 is a perspective view illustrating a conventional example of a coolant feeder.

In machine cutting or grinding with a machine tool, it is a conventional practice to supply or feed coolant to a position where the machine tool makes contact with a workpiece. A coolant feeder for this purpose is proposed as TOKKAIHEI (Japanese Provisional Publication) No. 8-197311, the coolant feeder being used for a multispindle automatic lathe. In the disclosed coolant feeder, coolant passages 52a, 53a, which are connected, are made in an x-axis slide 52 and a tool rest 53, respectively, of a cross slide 51 for holding a cutting tool 50, as shown in FIG. 21. In addition, one end opening of the coolant passage 52a of the x-axis slide 52 is connected via a distribution passage 54 (which is made of a tube or the like so as to be able to follow the tool rest 53) with a coolant supplier (not shown) while one end opening of the coolant passage 53a of the tool rest 53 is provided with a coolant supply pipe 55. In machining a workpiece 56, a coolant is fed through the distribution passage 54 and the coolant passages 52a, 53a, into the coolant supply pipe 55, and is ejected to a contacting point between the cutting tool 50 and the workpiece 56 from the tip at the open end of the coolant supply pipe 55. Further, this apparatus is designed in such a manner that a coolant is supplied to a tool on a tool slide (not shown). In the figure, 57 is a spindle carrier and 58 is a main axis.

However, in the above coolant feeder, only one kind of coolant is supplied to the contacting point between the cutting tool 50 and the workpiece 56 from one direction, which results in an insufficient cooling effect and insufficient lubricity. For this reason, there are problems of insufficient durability of the cutting tool 50 and poor finishing accuracy of the machined surface on the workpiece 56. Further, there is another problem from an environmental viewpoint in the case of using liquids like cooling water or oil cutting fluid as a coolant, because there is a necessity for the disposal of waste liquids.

Accordingly, it is an object of the present invention to provide a work machining method whereby the durability of a machining tool and the finishing accuracy of a machined surface on a work are superior and no environmental problem is caused.

SUMMARY OF THE INVENTION

To accomplish the above object, a work machining method according to the present invention includes providing two ejection devices for each ejecting a mist of liquid mounted on a machining apparatus, whereby different mists of liquids are ejected to a machining point from each of the ejection devices, respectively, in the work machining method.

According to the work machining method of the present invention, different mists of liquids are ejected from two ejection devices mounted on the machining apparatus to a machining point. For this reason, one mist of a liquid superior in cooling effect is ejected from one of the ejection devices, while the other mist of a liquid superior in lubricity is ejected from the other ejection device, whereby sufficient cooling effect as well as sufficient lubricity can be obtained for a machining tool and a workpiece, resulting in an improvement in durability of the machining tool as well as an improvement in the finishing accuracy of the machined surface. Further, since a mist of the two liquids are ejected from the ejection devices, there is no necessity of disposal of waste liquid, resulting in no environmental problems. In the present invention, the phrase "a face side of a machining tool" means not only a face side of a machining tool and its adjacent portion, but also cuttings of a workpiece, or all together of the face side, its adjacent portion and cutting. In addition, in the present invention, the phrase "a flank side of a machining tool" means not only a flank side of a machining tool and its adjacent portion, but also a machined surface of a workpiece, or all together of the flank side, its adjacent portion and the machined surface of a workpiece.

In the present invention, if the machining apparatus includes a turret, the turret can effectively be utilized.

In the present invention, in the case that a mist of cooling water is ejected from one of the ejection devices to a face side of a machining tool, while a mist of oil liquid is from the other ejection device to a flank side of a machining tool, sufficient cooling effect on the face side can be obtained by the mist of cooling water and also sufficient lubricity on the flank side can be obtained by the mist of oil liquid, resulting in improvement in durability of the machining tool as well as an improvement in the finishing accuracy of the machined surface.

DETAILED DESCRIPTION OF THE PREFERRED EMBODIMENTS

With reference to the attached drawings, the present invention will hereinafter be described by way of embodiments thereof.

Figure 1:
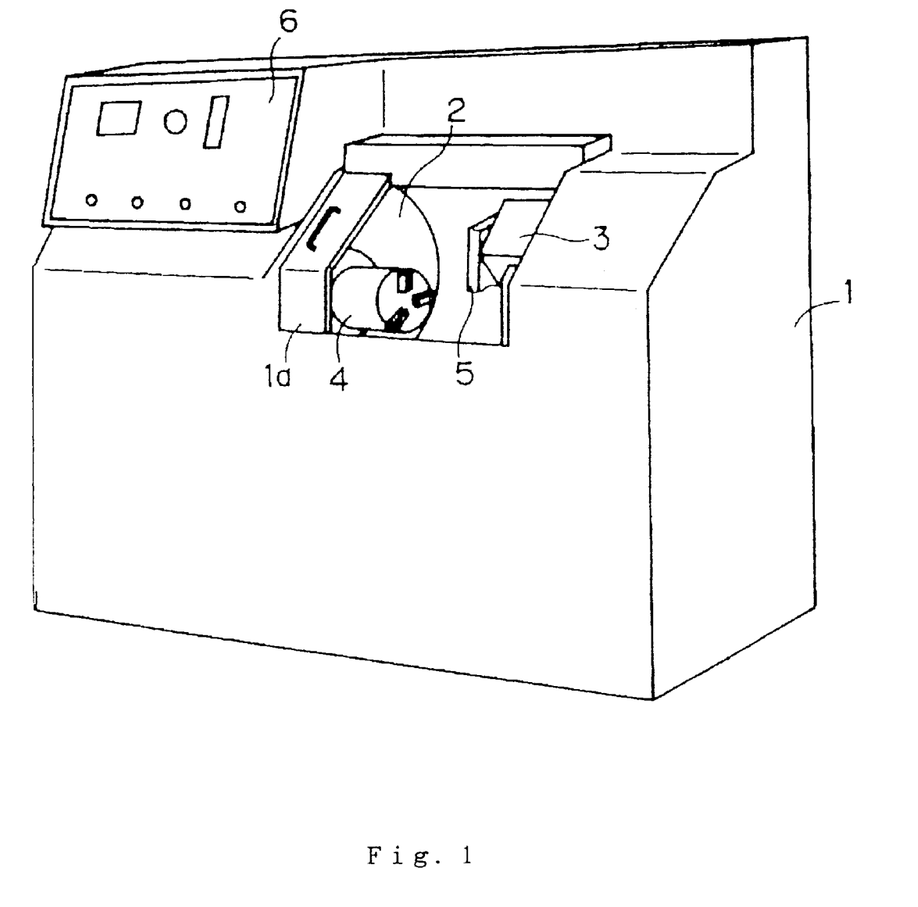
FIG. 1 is a schematic perspective view illustrating a NC lathe using one embodiment of the present invention.
Figure 2:
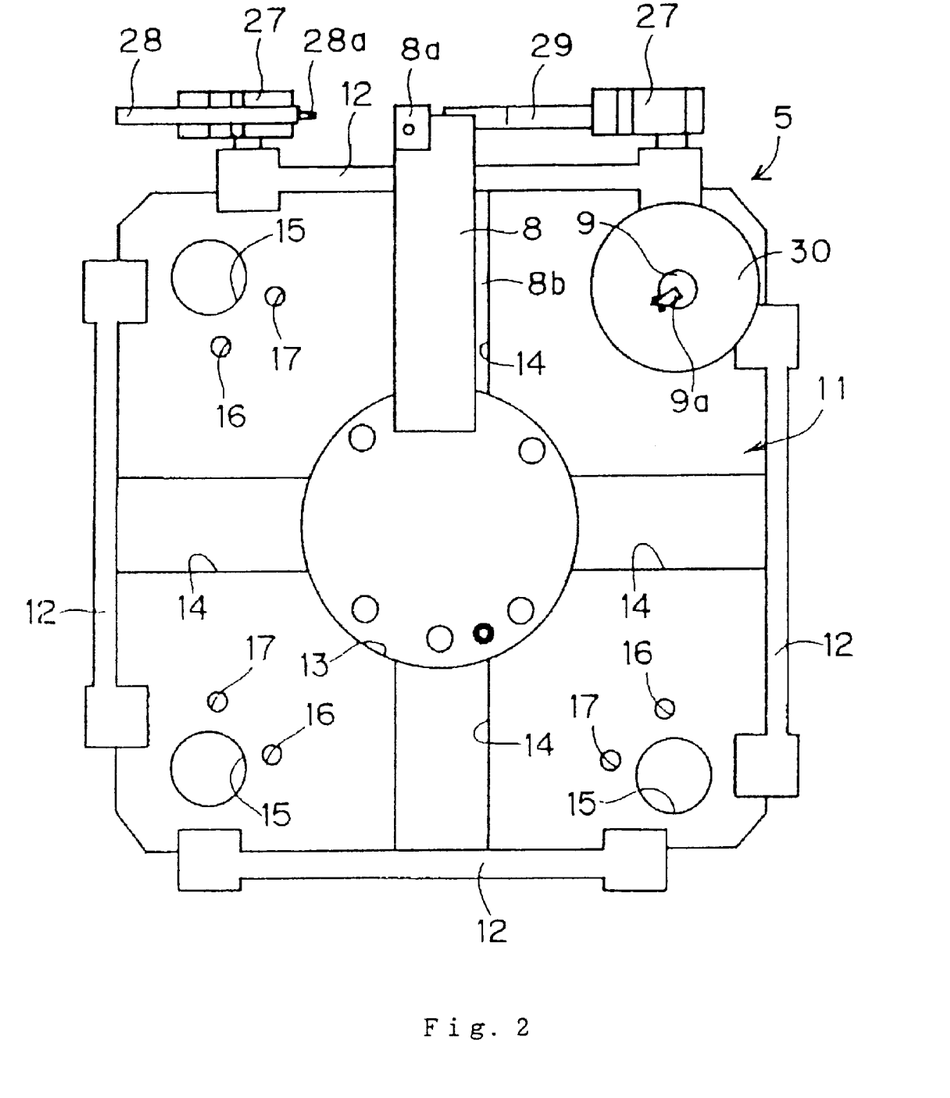
FIG. 2 is a front view of a turret used in the NC lathe of FIG. 1.

FIG. 1 illustrates an NC lathe using one embodiment of the present invention. The NC lathe shown includes a headstock 2 mounted on one side (the left side in the figure) inside a case 1, a tool rest 3 mounted on the other side (the right side in the figure) so as to face the to headstock 2, a chuck 4 rotatably mounted on the headstock 2, a turret 5 rotatably mounted on the tool rest 3, a control panel 6 installed on the case 1 and the like. During machining, a workpiece 10 is fixed to the chuck 4 (see FIGS. 18 and 19), a machining tool (an outside diameter tool 8, an inside diameter tool 9, or the like as shown in FIG. 2) is fixed to the turret 5, and the turret 5 is rotated by a rotator (not shown) mounted on the tool rest 3 so that the machining tool is positioned in a predetermined position, and then a main shaft (not shown) mounted on the headstock 2 is rotated so that the workpiece 10 rotated together therewith is machined or the like by the machining tool. In the NC lathe, a mist collector (not shown) is mounted on the NC lathe as a standard equipment so as to collect mist. In the FIG. 1d is a slidable door mounted on the case 1.

Figure 3:
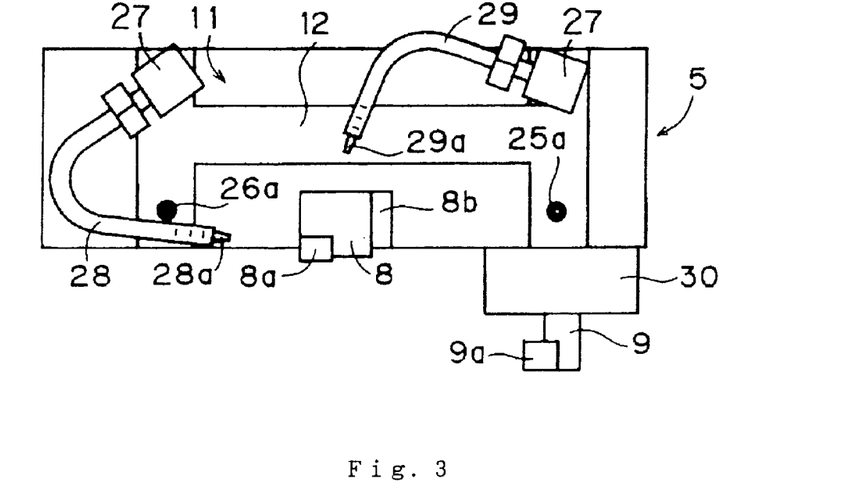
FIG. 3 is a plan view of the turret shown in FIG. 2.
Figure 4:
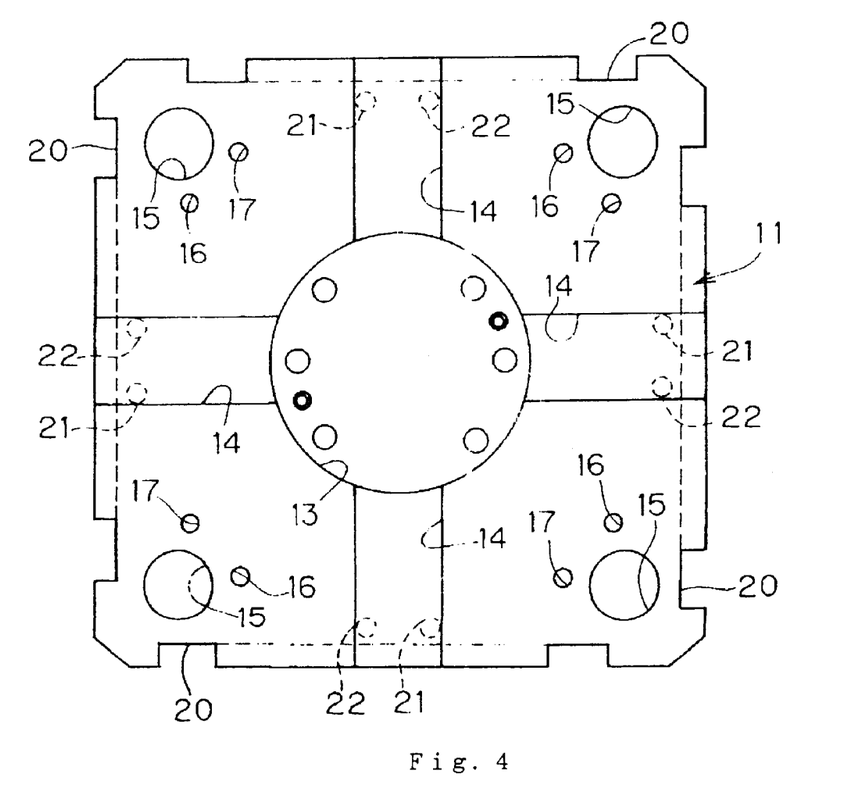
FIG. 4 is a front view of a turret body which forms a portion of the turret of FIG. 2.
Figure 5:
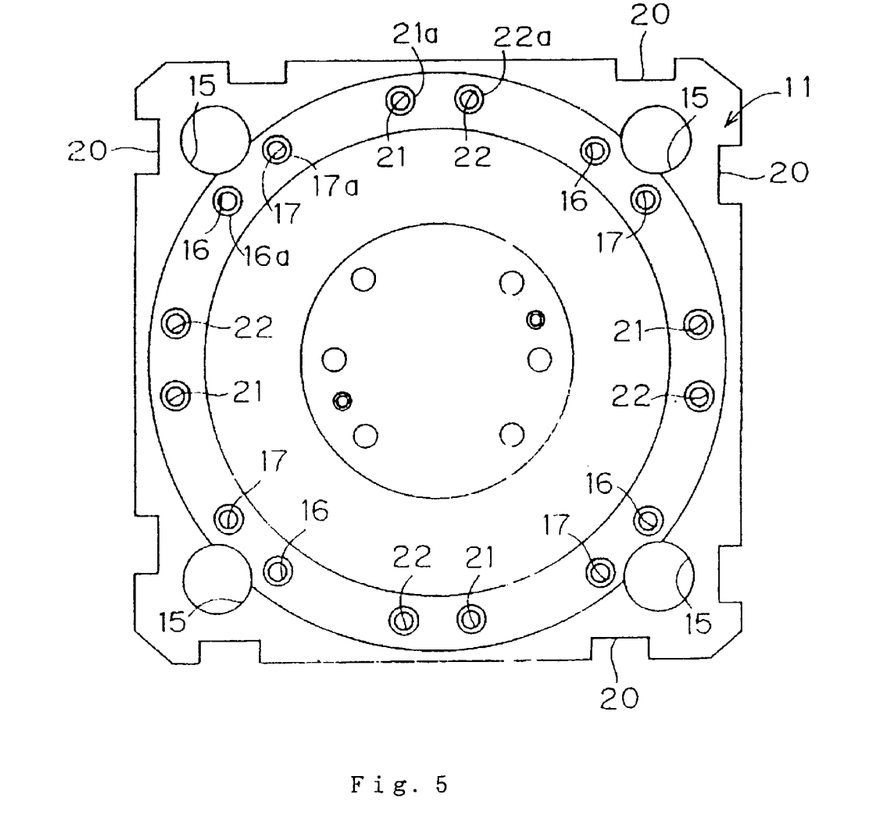
FIG. 5 is a rear view of the turret body of FIG. 4.
Figure 6:
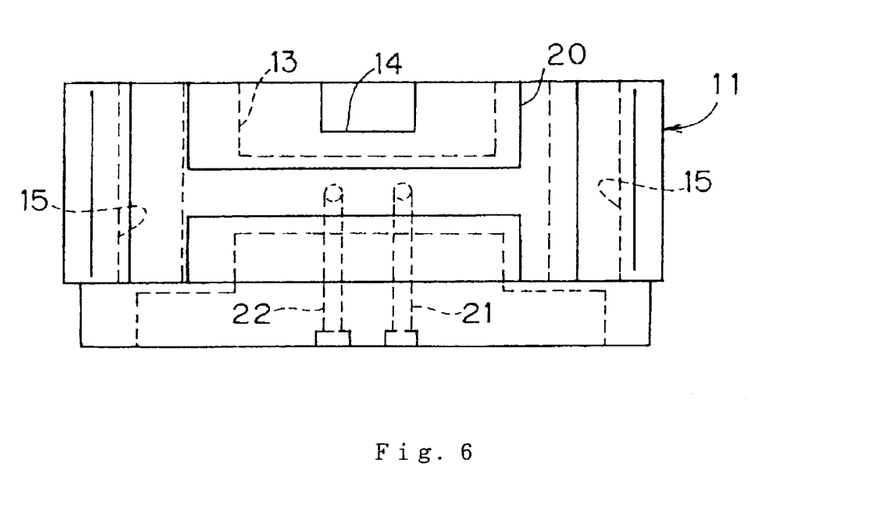
FIG. 6 is a plan view of the turret body of FIG. 4.

As shown in FIGS. 2 and 3, the turret 5 comprises a turret body 11 formed in a shape of a generally rectangular parallelopiped as well as four I-shaped bodies 12 fixed to four sides (both upper and bottom, and both left and right) of the turret body 11. As shown in FIGS. 4 to 6, a circular concave 13 is formed on a center of the left side (a side facing the headstock 2) of body 1 land four grooves 14, each of which extends either perpendicularly horizontally, are formed equidistantly (i.e., at intervals of about 90) in the body. Each groove 14 houses an outside diameter tool 8, which is fixed by fixing means 8b only one outside diameter tool 8 fixed to a groove 14 being shown in FIG. 2. In FIG. 2, a carbide chip 8a is mounted on the outside diameter tool 8, while a carbide chip 9a is mounted on the inside diameter tool 9.

In the turret body 11, each I-shaped groove 20 is formed on four sides (both upper and bottom, and both left and right). The I-shaped body 12 is engaged with the I-shaped groove 20, respectively, and is fastened by a screw (not shown).

A through hole 15 is made on four corners of the turret body 11 equidistantly (i.e., at intervals of about 90) on a circle concentric with a hypothetical center of the circular concave 13 so as to extend in parallel with a centerline of the circular concave 13. A cylindrical holder 30 for holding the inside diameter tool 9 is inserted and fixed to each through hole 15 (in FIG. 2, the cylindrical holder 30 is shown as being inserted and fixed to only one of through holes 15). A pair of passages 16, 17 (cooling water passage 16 and oil cutting fluid passage 17) are also made adjacent each through hole 15, these passages being located equidistantly (i.e., at intervals of about 90) on a circle concentric with the hypothetical center of the circular concave 13 and extend in parallel with a centerline of the circular concave 13 . Cooling water with compressed air passes through the cooling water passages 16, while oil cutting fluid with compressed air passes through the oil cutting fluid passages 17.

As shown in FIGS. 4–6, a pair of passages 21, 22 (cooling water passage 21 and oil cutting fluid passage 22), which extend from the rear of the body 11 and have an opening on each I-shaped groove 20 of the four sides (both upper and bottom, and both left and right), are made at a center point between each pair of the passages 16, 17, respectively (which is a center point of each side of both upper and bottom, and both left and right of the body 11). The pairs of passages 21, 22 are made, respectively, equidistantly (i.e., at intervals of about 90) on a circle concentric with a hypothetical center of the circular concave 13 (see FIG. 5) from the rear of the body 11 so as to extend in parallel with a centerline of the circular concave 13 to a position beneath the I-shaped groove 20, and then extend straight at a right angle of the centerline and finally have an opening on each longitudinal line of the I-shaped groove 20. Cooling water passes together with compressed air through the cooling water passage 21, while oil cutting fluid together with the compressed air passes through the oil cutting fluid passage 22.

Figure 7:
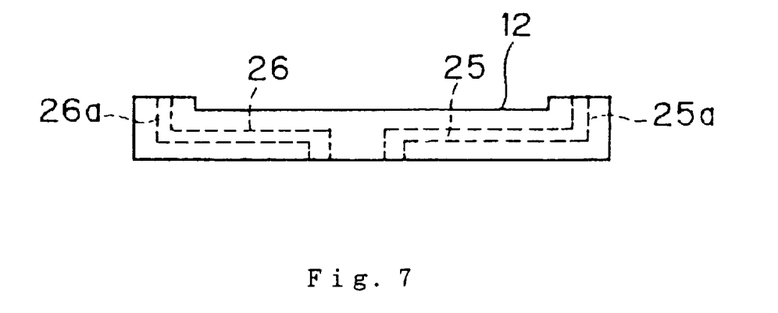
FIG. 7 is a rear view of an I-shaped body which forms a portion of the turret of FIG. 2.
Figure 8:
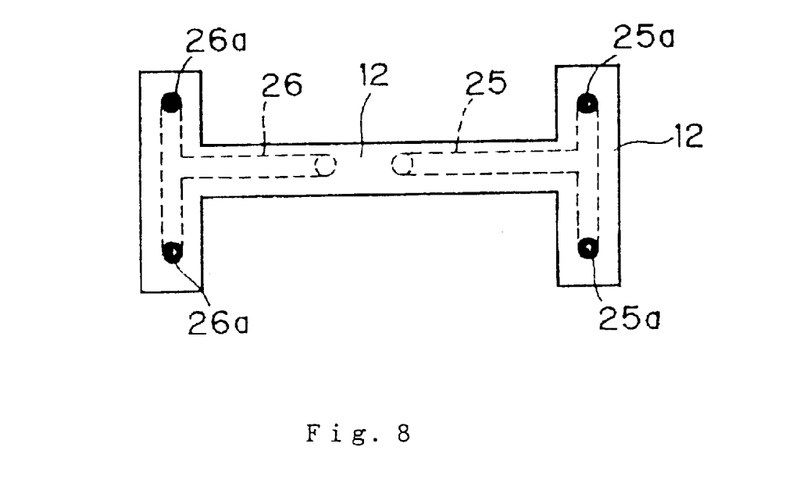
FIG. 8 is a plan view of the I-shaped body of FIG. 7.
Figure 9:
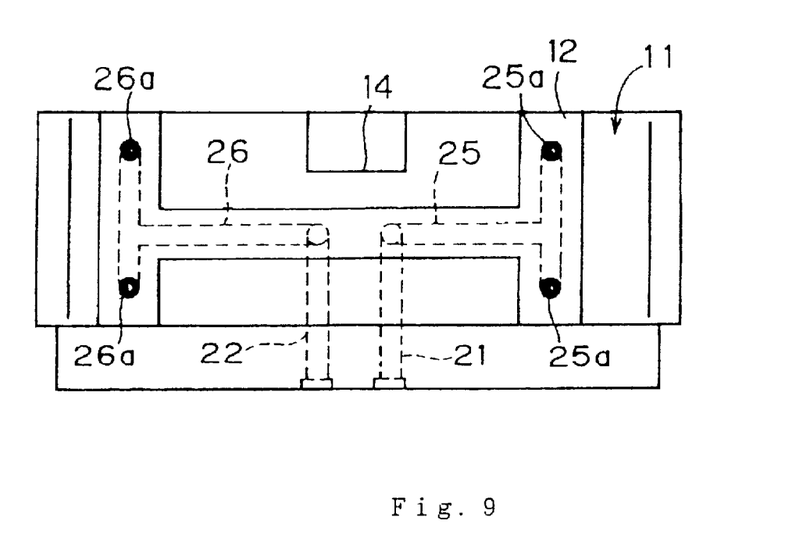
FIG. 9 is a plan view of the turret showing the I-shaped body mounted on the turret body.
Figure 10:
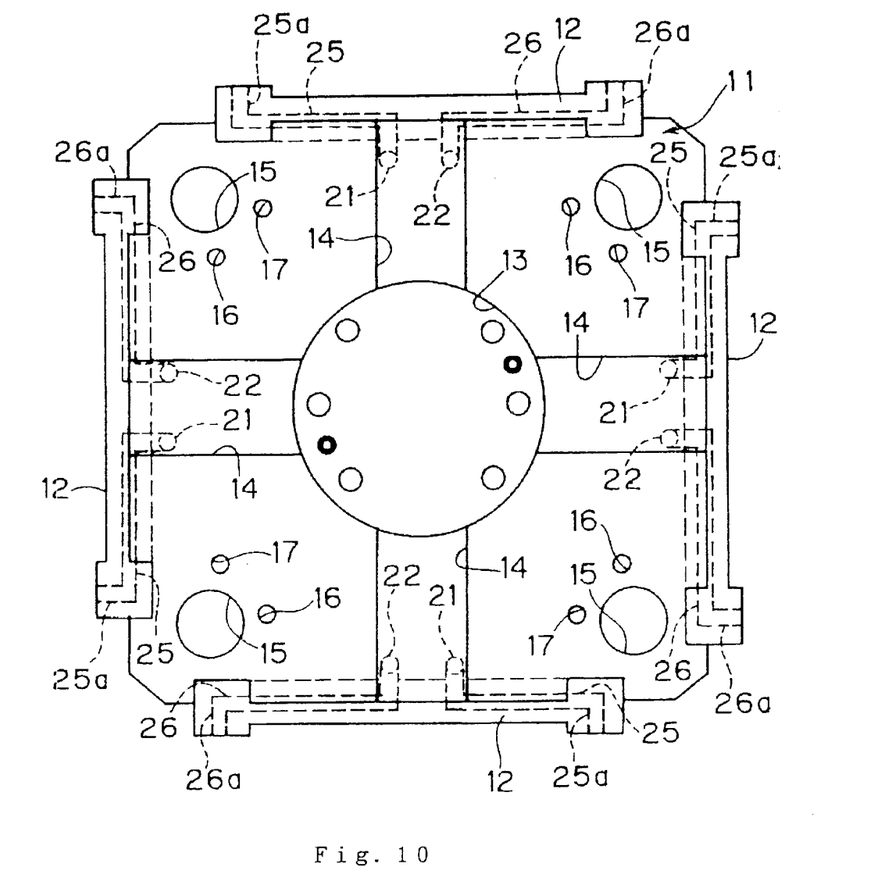
FIG. 10 is a front view of the turret showing the I-shaped body mounted on the turret body.

As shown in FIGS. 7 and 8, I-shaped body 12 is provided with a pair of passages 25, 26, which are passages for cooling water and oil cutting fluid, respectively, and which extend from the inner surface contacting with the turret body 11 and connect with the cooling water passage 21 and the oil cutting fluid passage 22, respectively, as shown in FIGS. 9 and 10. These passages 25, 26 have an opening on the outside surface of I-shaped body 12. That is, the pair of passages 25, 26 extend straight from the portions on the I-shaped body 12 corresponding to both opening of the I-shaped grooves 20 of the four sides of the body 11 (i.e., each longitudinal line of the I-shaped body 12) at a right angle of the centerline, extend straight to the nearest lateral line of the I character, branch off and extend straight and in parallel with the centerline, and then extend straight at a right angle of the centerline so as to have an opening on the outside surface of the lateral line, respectively. Cooling water and compressed air flow into the passage 25 from the cooling water passage 21, while oil cutting fluid and compressed air flow into the passage 26 from the oil cutting fluid passage 22.

Threaded portions 25a, 26a are formed in the open ends on the outside surface of the cooling water passage 25 and the oil cutting fluid passage 26, respectively, and an end threaded portion (not shown) of an elbow 27 is fastened on each of the threaded portions 25a, 26a, respectively. A threaded end portion (not shown) of a flexible cooling water supply tube 28 is connected with the other threaded end portion (not shown) of the elbow 27 fastened on the threaded portion 25a of the cooling water passage 25, while a threaded end portion (not shown) of a flexible oil cutting fluid supply tube 29 is connected with the other threaded end portion (not shown) of the elbow 27 fastened on the threaded portion 26a of the oil cutting fluid passage 26 (see FIGS. 2 and 3). A nozzle 28a at an end of the cooling water supply tube 28 is positioned toward a face side of the outside diameter tool 8 so as to eject and supply cooling water in a mist form (mist liquid) on the face side of the outside diameter tool 8 from the nozzle 28a of the cooling water supply tube 28. On the other hand, a nozzle 29a at an end of the oil cutting fluid supply tube 29 is positioned toward a flank side of the outside diameter tool 8 so as to eject and supply oil cutting fluid in a mist form (mist liquid) on the flank side of the outside diameter tool 8 from the nozzle 29a of the oil cutting fluid supply tube 29.

Figure 11:
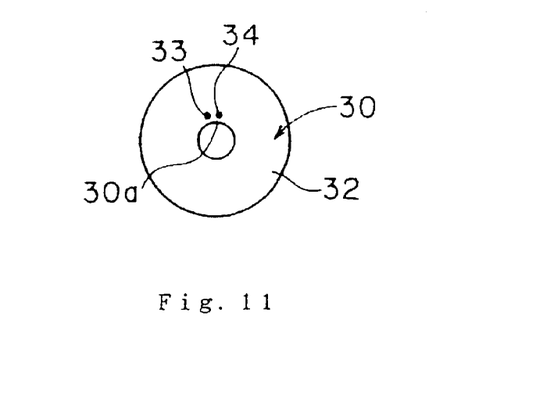
FIG. 11 is a front view of a cylindrical holder mounted on the turret of FIG. 2.
Figure 12:
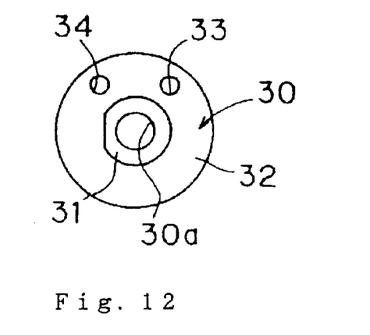
FIG. 12 is a rear view of the cylindrical holder of FIG. 11.
Figure 13:
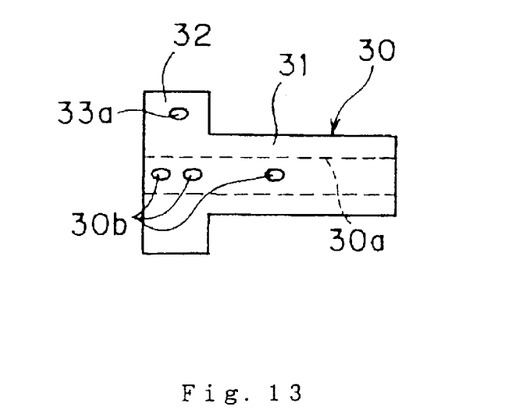
FIG. 13 is a side view of the cylindrical holder of FIG. 11.
Figure 14:
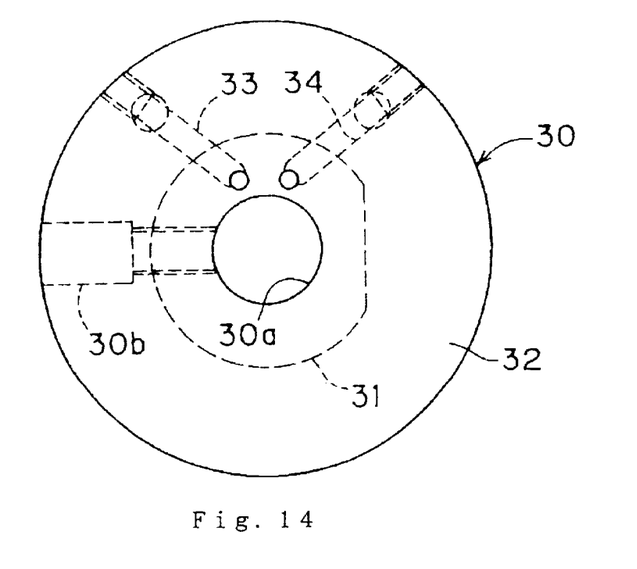
FIG. 14 is an enlarged front view of the cylindrical holder of FIG. 11.
Figure 15:
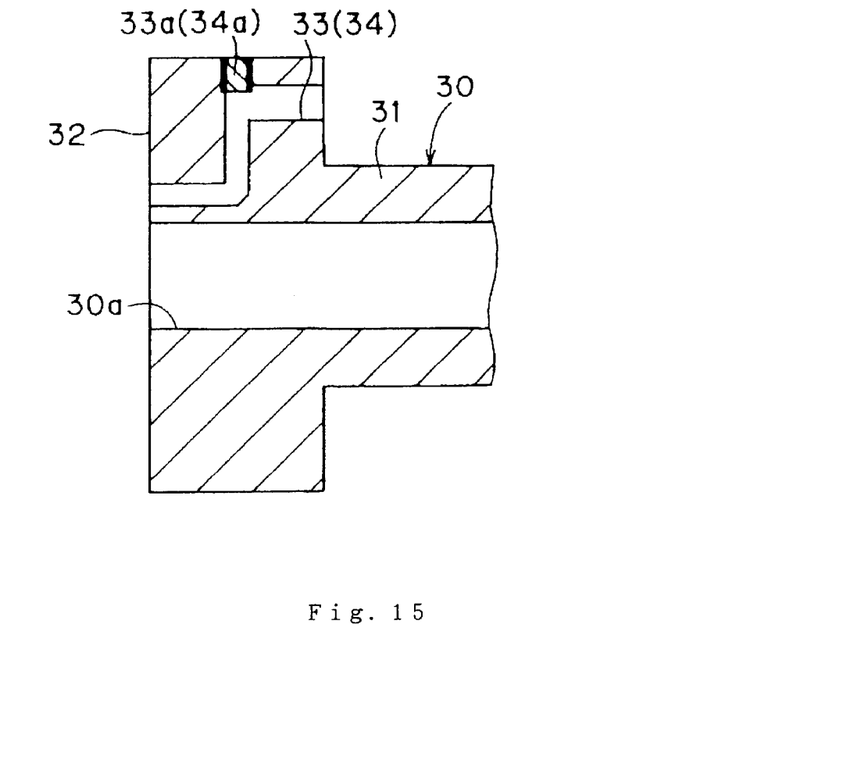
FIG. 15 is an enlarged sectional view of an essential part of cylindrical holder of FIG. 11.

As shown in FIGS. 11 to 13, the cylindrical holder 30 comprises a generally ¾ cylindrical portion 31 (whose chord or flat portion is used to determine a position of tool) which is inserted into through hole 15 of the turret body 11. The cylindrical holder 30 further includes a large-diameter cylindrical portion 32 which protrudes from the side of the turret body 11. The inside diameter tool 9 is held and fastened in a center hole 30a in both of the cylindrical portions 31, 32. A pair of passages 33, 34 are made in the large cylindrical portion 32, these passages extending from the right side of the large-diameter cylindrical portion 32 as shown in FIG. 13 which contact with the left side of the turret body 11) and having an opening on the left side. The passage 33 connects with the cooling water passage 16, while the passage 34 connects with the oil cutting fluid passage 17. As illustrated in FIGS. 13 to 15, the pair of passages 33, 34, connecting with the pair of passages 16, 17, respectively, extend straight leftward from the right side of the large-diameter cylindrical portion 32 as shown in FIG. 13, that is, in parallel with the centerline of the center hole 30a, then extend straight and inwardly in a radial direction of the cylindrical holder (i.e., each at a right angle to the centerline), and further each extend straight leftward (FIG. 13) in parallel with the centerline and then have an opening on a left side (FIG. 13) of the large cylindrical portion 32 as shown in FIG. 11.

The combined cooling water and compressed air flow from the cooling water passage 16 into the passage 33, while the combined oil cutting fluid and compressed air flow from the oil cutting fluid passage 17 into the passage 34. The open end of the cooling water passage 33 is positioned toward a face side of the inside diameter tool 9, so that cooling water in a mist form (mist liquid) is ejected and supplied to the face side of the inside diameter tool 9. On the other hand, the open end of the oil cutting fluid passage 34 is positioned toward a flank side of the inside diameter tool 9, so that oil cutting fluid in a mist form (mist liquid) is ejected and supplied to the flank side of the inside diameter tool 9. In FIG. 13, 30b is a hole where a bolt for fastening the inside diameter tool 9 is inserted. In FIG. 15, 33a and 34a are plugs.

Figure 16:
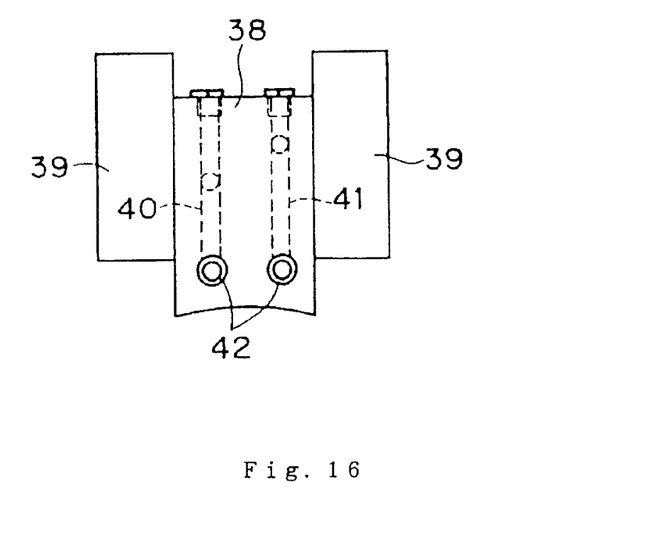
FIG. 16 is a front view of a supply apparatus for the turret of FIG. 2.
Figure 17:
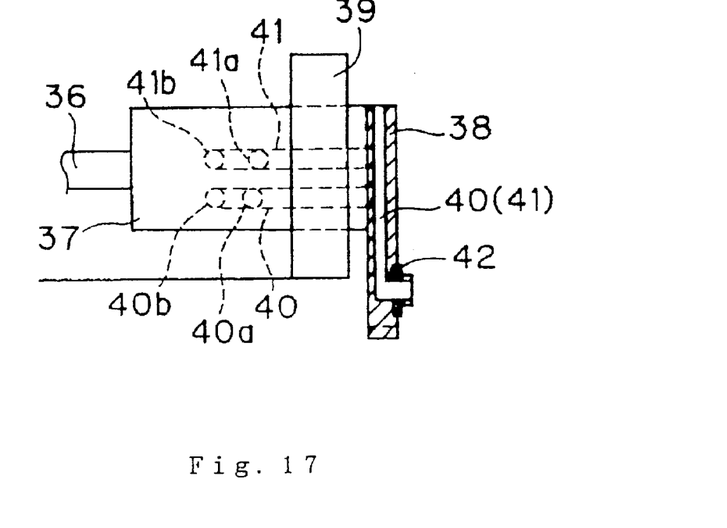
FIG. 17 is a view illustrating the construction of the supply portion and a connecting apparatus of FIG. 16.

Cooling water and compressed air are supplied to the cooling water passages 16, 21, 25, 33 and to the cooling water supply tube 28 by an apparatus shown in FIGS. 16 and 17, while oil cutting fluid and compressed air are supplied to the oil cutting fluid passages 17, 22, 26, 34 and to the oil cutting fluid supply tube 29 by the same apparatus. The apparatus comprises a cylinder (not shown), a connecting portion 37 incorporated with a piston rod 36 of the cylinder, a supply portion 38 installed on a tip of the connecting portion 37 and a guide 39 for guiding the connecting portion 37, wherein a pair of passages 40, 41 (cooling water passage 40 and oil cutting fluid passage 41) in the connecting portion 37 are made so as to be connected with the passages 40, 41 in the supply portion 38, respectively. In addition, two openings 40a, 40b are made in the cooling water passage 40 of the connecting portion 37. One opening 40a is connected with a hose (not shown) for supplying cooling water from a supply apparatus including a cooling water (such as tap water) tank and a pump (both not shown), while the other opening 40b is connected with a hose (also not shown) for supplying compressed air from a compressor (not shown). On the other hand, two openings 41a, 41b are made in the oil cutting fluid passage 41 of the connecting portion 37. One opening 41a is connected with a hose (not shown) for supplying oil cutting fluid from a supply apparatus including an oil cutting fluid (Bluebe #LB-1, available from the U.S. ITW Corp.) tank and a pump (both not shown), while the other open 41b is connected with a hose (not shown) for supplying compressed air from the compressor.

In operation of the apparatus, when turret 5 is rotated for positioning, the supply portion 38 is spaced from a right side of the body 11 of the turret 5 by driving the cylinder and retracting the piston rod 36. After positioning the turret 5, the piston rod 36 is extended so that a front surface of the supply portion 38 is adhered to a right side of the body 11.

Thereby, the cooling water passage 40 and the oil cutting fluid passage 41 of the supply portion 38 are connected with the cooling water passage 16 (21) and the oil cutting fluid passage 17 (22), respectively, of the turret body 11. At that time, a circular rubber seal 42, mounted on each outlet of both passages 40, 41 of the supply portion 38 is engaged in a fluid tight state with each circular concave portion 16a, 17a, 21a, 22a(see FIG. 5) of each passage 16, 17, 21, 22.

Figure 18:
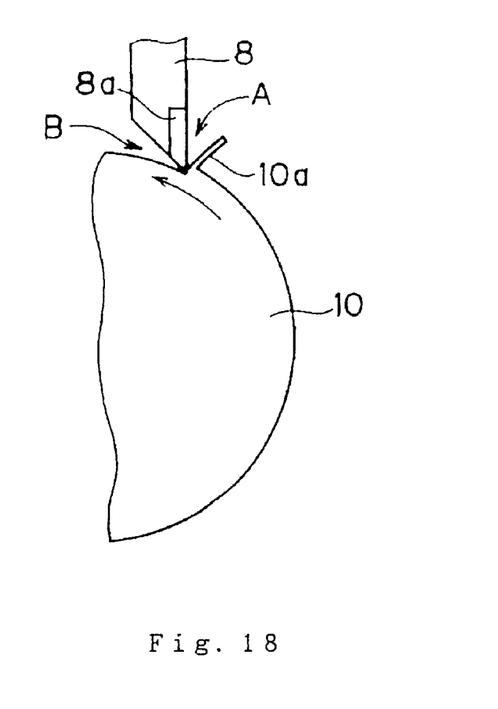
FIG. 18 is a view illustrating a situation where a workpiece is being machined by an outside diameter tool.
Figure 19:
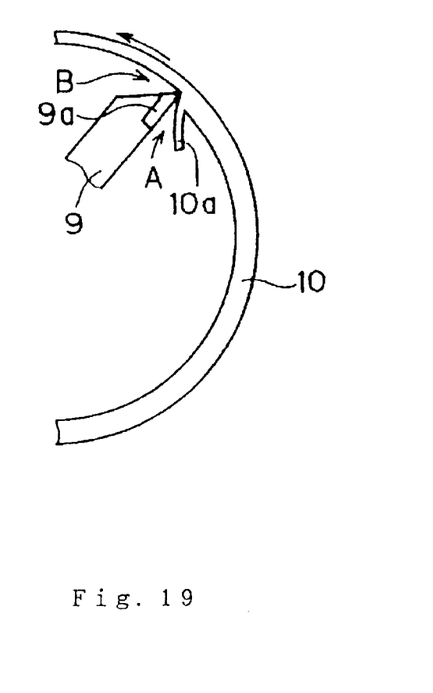
FIG. 19 is a view illustrating a situation where a workpiece is being machined by an inside diameter tool.

In the above construction, in machining with the outside diameter tool 8, the cooling water passage 40 and the oil cutting fluid passage 41 of the supply portion 38 are connected with the cooling water passage 21 and the oil cutting fluid passage 22 of the turret body 11, respectively. On the other hand, in machining with the inside diameter tool 9, the cooling water passage 40 and the oil cutting fluid passage 41 of the supply portion 38 are connected with the cooling water passage 16 and the oil cutting fluid passage 17 of the turret body 11, respectively. During the machining of a workpiece, the pump and the compressor of the cooling water supply apparatus and the oil cutting fluid supply apparatus are driven. Thereby, mist of cooling water is supplied to the face side (shown by an arrow "A" in FIGS. 18 and 19) of the outside diameter tool 8 or the inside diameter tool 9, while a small amount of mist of oil cutting fluid is supplied to the flank side (shown by an arrow "B" in FIGS. 18 and 19) of the outside diameter tool 8 or the inside diameter tool 9. The mist of cooling water impinges on the face side so that water particles of the mist of cooling water dissipate the heat generated in machining, while the mist of oil cutting fluid impinges on the flank side so that the oil particles of the oil cutting fluid properly moisten or wet the outside diameter tool 8, the inside diameter tool 9 and the workpiece 10, resulting in improvement in lubricity. In FIGS. 18 and 19, 10a is cutting of the workpiece 10.

Thus, since the mist of cooling water is supplied to the face side of the outside diameter tool 8 or the inside diameter tool 9, while the mist of oil cutting fluid is supplied to the flank side thereof in the above embodiment, both a cooling effect and lubricity are imparted to the outside diameter tool 8, the inside diameter tool 9 and the workpiece 10, resulting in considerable improvement in processability. Since a mist collector typically is mounted as a standard equipment in a NC lathe, it is possible to dry the cutting.

Figure 20:
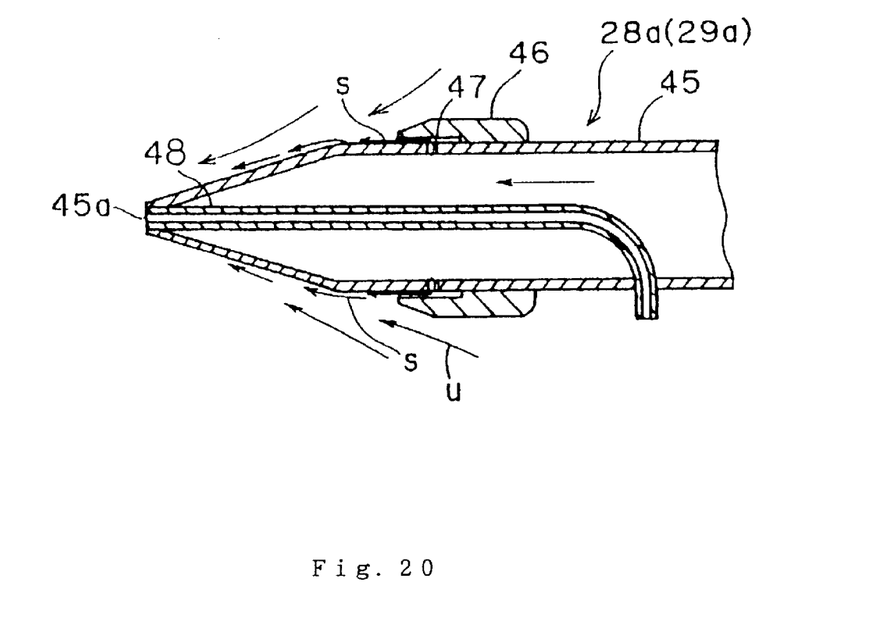
FIG. 20 is a sectional view illustrating an essential portion a modified embodiment of a nozzle.

FIG. 20 illustrates a modification of the nozzles 28a, 29a. In this embodiment, a guide ring 46 is in external engagement with each nozzle body 45 of the nozzles 28a, 29a, respectively so that air is ejected from each gap 47 as shown by an arrow "S" and generates a flow in the adjacent air as shown by an arrow "U", resulting in a subsidiary flow of air. A liquid discharge hole 45a is at the end of a small-diameter portion of the nozzle body 45 so as to supply liquid (cooling water or oil cutting fluid) via a liquid supply tube 46 from the inside of the nozzle. In this embodiment, a mist of cooling water or a mist of oil cutting fluid is ejected from the liquid discharge hole 45a.

In addition, in the above embodiments, the average particle diameter of the mist of water ejected from the nozzle 28a may depend upon machining conditions, however, it is preferred to usually be within a range of about 3 to 10 $\mu$m. It is preferred that the amount of the ejected mist of water therefrom is usually within a range of about 0.5 to 5 cc/min. On the other hand, the average particle diameter of the mist of oil cutting fluid injected from the injection nozzle 29a may depend upon machining conditions, however, it is preferred to usually be within a range of about 3 to 10 μm. It is preferred that the amount of the ejected mist of oil cutting fluid therefrom is usually within a range of about 0.1 to 0.5 cc/min.

In addition, in the above embodiments, tap water is used as the cooling water, but such is not critical, and pure water or super pure water may be used. Further, in the above both embodiments, Bluebe #LB-1 is used as the oil cutting fluid, but such is not critical, and usual various other oil cutting fluids may be used. Still further, in the above both embodiments, two kinds of liquids, i.e., a cooling water and an oil cutting fluid are used, which are not critical, and an emulsion or a chemical agent, or the like, may be used. Even still further, the number of liquids is not limited to two kinds, as three or more liquids may be mixed and used.

In addition, the application of the apparatus of the present invention is not limited to machining with a NC lathe, like both of the above described embodiments. The subject invention may be applicable to other type of machines such as machining centers and grinders.

EFFECT OF THE INVENTION

According to the work machining method of the present invention, a mist of liquid superior in cooling effect is ejected from one of the ejection parts, while a mist of liquid superior in lubricity is ejected from the other ejection part, whereby sufficient cooling effect and lubricity can be obtained for a machining tool and a workpiece, resulting in an improvement in the durability of the machining tool and finishing accuracy of the machined surface. Further, since a mist of liquids are ejected from the ejection parts, there is no necessity of disposal of waste liquid, resulting in no environmental problems.

In the present invention, if the machining apparatus is a turret, the turret can effectively be utilized.

In the present invention, in the case that a mist of cooling water is ejected from one of the ejection devices to a face side of a machining tool, while a mist of oil liquid is ejected from the other ejection device to a flank side of a machining tool, a sufficient cooling effect on the face side can be obtained by the mist of cooling water and while sufficient lubricity on the flank side also can be obtained by the mist of oil liquid, resulting in improvement in durability of the machining tool and as well as in finishing accuracy of the machined surface.

What is claimed is:

1. A work machining method, comprising the steps of:

providing two ejection devices in a machining apparatus including a turret; and ejecting a liquid in a mist form from one of the two ejection devices toward a face side of a machining tool in a machined part and ejecting a different liquid in a mist form from the other ejection device toward a flank side of the machining tool in a machined part during work machining.

2. A method as set forth in claim 1, wherein cooling water in mist form is ejected from one of the ejection devices so as to be supplied to a face side of a machining tool while oil cutting fluid in a mist form is ejected from the other ejection device so as to be supplied to a flank side of the machining tool in a mist form.

* * * * *